US008951620B2

(12) United States Patent
Kumazawa

(10) Patent No.: US 8,951,620 B2
(45) Date of Patent: Feb. 10, 2015

(54) FRAME MEMBER, MOLDING APPARATUS, AND MANUFACTURING METHOD FOR FRAME MEMBER

(71) Applicant: Aichi Co., Ltd., Nagoya-shi, Aichi-ken (JP)

(72) Inventor: Taku Kumazawa, Ichinomiya (JP)

(73) Assignee: Aichi Co., Ltd., Nagoya-shi, Aichi-ken (JP)

(*) Notice: Subject to any disclaimer, the term of this patent is extended or adjusted under 35 U.S.C. 154(b) by 9 days.

(21) Appl. No.: 13/745,223

(22) Filed: Jan. 18, 2013

(65) Prior Publication Data

US 2013/0189466 A1 Jul. 25, 2013

(30) Foreign Application Priority Data

Jan. 24, 2012 (JP) .................................. 2012-012208

(51) Int. Cl.
 *B32B 5/02* (2006.01)
 *A47C 7/28* (2006.01)

(52) U.S. Cl.
 CPC ................. *B32B 5/028* (2013.01); *A47C 7/282* (2013.01)
 USPC .......... 428/38; 425/500; 264/39; 297/452.48; 297/452.63; 297/452.64

(58) Field of Classification Search
 CPC ................................ B32B 5/028; A47C 7/282
 USPC ............................ 428/38; 297/452.48–452.64
 See application file for complete search history.

(56) References Cited

U.S. PATENT DOCUMENTS 8,616,655 B2 * 12/2013 Jung ........................ 297/452.56
2005/0064149 A1 3/2005 Iseki et al.

FOREIGN PATENT DOCUMENTS

| JP | 2002240081 A | 8/2002 |
| JP | 3845049 B2 | 11/2006 |
| JP | 2008259673 A | 10/2008 |
| JP | 2011173268 A | 9/2011 |

OTHER PUBLICATIONS

Machine Translation of JP 2002-240081. Aug. 2002.*

* cited by examiner

*Primary Examiner* — Maria Veronica Ewald
*Assistant Examiner* — Brian Handville
(74) *Attorney, Agent, or Firm* — Jenkins, Wilson, Taylor & Hunt, P.A.

(57) ABSTRACT

A frame member includes a frame body and a sheet member. The frame body has a front surface, a back surface, an opening penetrating in a front and back direction of the frame body, and a protruding portion. One of the front surface and the back surface has an attachment groove. The sheet member constituted by a mesh-like member is stretched over the opening. The protruding portion is configured such that, after the sheet member is arranged in an area where the protruding portion is to be formed, a material for the frame body in an unsolidified state is filled and is solidified, to thereby form the protruding portion together with the frame body and fix the sheet member in a stretched state over the opening. The sheet member has reached one of the front surface and the back surface along an inner circumferential surface of the frame body.

3 Claims, 8 Drawing Sheets

II—II

VIIIB—VIIIB

FRAME MEMBER, MOLDING APPARATUS, AND MANUFACTURING METHOD FOR FRAME MEMBER

CROSS-REFERENCE TO RELATED APPLICATIONS

This application claims the benefit of Japanese Patent Application No. 2012-012208 filed Jan. 24, 2012 in the Japan Patent Office, the disclosure of which is incorporated by reference herein.

BACKGROUND

The present invention relates to a frame member including a frame body with an attachment groove formed for attaching an attachment object thereinto, and a mesh-like sheet member stretched over the frame body.

In a frame member disclosed in Japanese Patent No. 3845049, there is proposed a configuration in which an edge (a cut edge after cutting) of a sheet member is placed in an attachment groove of a frame body, and the edge is covered with an attachment object. According to such configuration, it is possible to prevent spoiling of an appearance of the frame member without performing a particular covering process (a process for covering the edge of the sheet member).

SUMMARY

It is desirable to allow attachment of the attachment object to the frame member in a more accurate manner than ever before in addition to preventing spoiling of the appearance of the frame member.

A frame member in a first aspect of the present invention includes a frame body and a sheet member. The frame body has a front surface, a back surface, and an opening penetrating in a front and back direction of the frame body. One of the front surface and the back surface has an attachment groove formed to attach a predetermined attachment object thereinto. The sheet member, which is to be stretched over the opening of the frame body, is constituted by a mesh-like member with holes sized to allow passage therethrough of a material for the frame body in an unsolidified state. The frame body includes a protruding portion protruding inward from an inner circumferential surface of the frame body. The protruding portion is configured such that, after the sheet member is arranged along at least one of an inward and outward direction, and the front and back direction of the frame body in an area where the protruding portion is to be formed, the material for the frame body in the unsolidified state is filled into the area and is solidified, to thereby form the protruding portion together with the frame body, and fix the sheet member in a stretched state over the opening. The sheet member has reached one of the front surface and the back surface along the inner circumferential surface of the frame body.

According to the frame member configured as above, the sheet member is fixed so as to reach one of the front surface and the back surface along the inner circumferential surface of the frame body, and an edge of the sheet member is concealed on an inner side of the frame body. This may make the edge of the sheet member become less externally visible and therefore enable to suppress the appearance of the frame member from being spoiled.

The sheet member (i.e., the edge of the sheet member) is configured to reach the front surface or the back surface of the frame body along the inner circumferential surface thereof, and not to allow the edge of the sheet member to project into the attachment groove. Accordingly, the edge of the sheet member will not interfere with the attachment object. It is, therefore, possible to achieve an improved attachment accuracy of the attachment object.

With such configuration as described above, it is possible to attach the attachment object to the frame member in a more accurate manner as well as to prevent spoiling of the appearance of the frame member.

The protruding portion may be formed as a single member which continues over the entire circumference of the frame body, or may be formed at predetermined intervals over the entire circumference of the frame body. (In other words, the protruding portion may be formed as a plurality of discontinued protruding members).

Also, the attachment groove may be formed as a single groove which continues over the entire circumference of the frame body, or may be formed at predetermined intervals over the entire circumference of the frame body (In other words, the attachment groove may be formed as a plurality of discontinued grooves).

Further, the sheet member is only required to reach the front surface or the back surface of frame body along the inner circumferential surface of the frame body. The sheet member may pass the protruding portion in a process to reach the front surface or the back surface along the inner circumferential surface, or may first pass the protruding portion and then reach the front surface or the back surface along the inner circumferential surface for the purpose of enhancing strength of the sheet member against tension.

A frame member in a second aspect of the present invention, the sheet member is arranged such that the edge of the sheet member, which has reached the protruding portion, passes along the inward and outward direction of the frame body by a specified distance, and subsequently advances toward a front surface side or a back surface side of the frame body along the inner circumferential surface of the frame body.

In this configuration, the sheet member (i.e., the edge of the sheet member) extends along the inward and outward direction of the frame body at least by a specified distance. With such configuration, an extending direction of the sheet member and a stretched direction of the sheet member are approximate (in other words, an angular difference between the extending direction of the sheet member and the stretched direction of the sheet member is smallest), and a force in such a direction as to tear off the edge of the sheet member in a state where the sheet member is stretched is unlikely to be exerted. It may, therefore, be possible to suppress the sheet member from being torn off by being stretched. In other words, it may be possible to fix the sheet member to the frame body more firmly.

In this configuration, the distance (an extending distance) by which the sheet member passes along the inward and outward direction of the frame body may be determined depending on a potential tensile force to be caused in the sheet member, and may be a distance that can ensure a minimum required strength.

The protruding portion may be provided over at least a part of the inner circumferential surface. Alternatively, the protruding portion may be provided over to the surface (the front surface or the back surface) which the sheet member has reached.

In the frame member of the present invention, the protruding portion may be formed along the inner circumferential surface of the frame body at least over to the surface (the front surface or the back surface) which the sheet member has reached.

With this configuration, since the protruding portion is formed over to the front surface or the back surface of the frame body, the sheet member is arranged inside the protruding portion until the sheet member reaches the front surface or the back surface along the inner circumferential surface of the frame body, and as a result, the sheet member located on the inner side of the frame body may also be concealed. It may, therefore, be possible to more effectively suppress spoiling of the appearance.

The protruding portion which is required to have a function of fixing the sheet member may have another function by devising the configuration of the protruding portion.

For example, in a third aspect of the present invention the protruding portion may include a protruding part that protrudes inward from the inner circumferential surface of the frame body and an extending part that extends from an end of the protruding part along the inner circumferential surface.

With this configuration, a rib shape constituted by the protruding part and the extending part of the protruding portion enables to resist a force in a direction of bending the frame body, and thereby an increased frame strength of the frame body may be achieved.

The extending part of the protruding portion may have a length allowing contribution to the strength of the frame body. The extending part preferably has a length so as to reach the front surface or the back surface along the inner circumferential surface of the frame body. In this case, the sheet member located on the inner side of the frame body may be covered with the extending part, and it may be possible to suppress spoiling of the appearance.

A molding apparatus in a fourth aspect of the present invention is a molding apparatus for manufacturing the frame member in the first to third aspects of the present invention. The molding apparatus includes: a first mold form, a second mold form, and a third mold form. The first mold form is shaped to provide a configuration of an opposite surface to a surface which the sheet member reaches, which is one of the front surface and the back surface of the frame body. The second mold form is shaped to provide a configuration of the surface that the sheet member reaches, which is one of the front surface and the back surface of the frame body, and a configuration of a portion of the frame body outer than a position of arrangement of the sheet member. The third mold form shaped to provide a configuration of a portion of the frame body inner than the position of arrangement of the sheet member.

The first mold form, the second mold form, and the third mold form are configured to be assembled in a state where the sheet member is sandwiched between the first mold form and the third mold form, as well as between the second mold form and the third mold form, to thereby provide a configuration of the frame body defined by an area surrounded by the first to third mold forms.

The third mold form includes a positioning portion configured to position an edge of the sheet member, the positioning portion being provided between a surface of the third mold form which sandwiches the sheet member with the first mold form, and a surface of the third mold form which sandwiches the sheet member with the second mold form, and a part of the positioning portion being configured as a recess which extends toward at least one of the inward and outward direction, and the front and back direction of the frame body.

The molding apparatus configured as above is feasible to manufacture the frame member of the present invention.

A method for manufacturing a frame member in a fifth aspect of the present invention is a method for manufacturing the frame member in the first to third aspects of the present invention. The method includes: a step of preparing the aforementioned molding apparatus; and a step of manufacturing the frame member in which the sheet member is fixed to the frame body in a stretched state over the frame body. The step of manufacturing the frame member includes: assembling the first mold form, the second mold form, and the third mold form in a state where the sheet member is sandwiched between the first mold form and the third mold form, as well as between the second mold form and the third mold form, and subsequently filling the material for the frame body in an unsolidified state into the area surrounded by the first to third mold forms and solidifying the material.

According to the manufacturing method as described above, it is possible to manufacture the frame member of the present invention.

BRIEF DESCRIPTION OF THE DRAWINGS

The present invention will now be described by way of exemplary embodiments with reference to the accompanying drawings, in which.

DETAILED DESCRIPTION OF THE PREFERRED EMBODIMENTS (1) Basic Configuration

Figure 1:
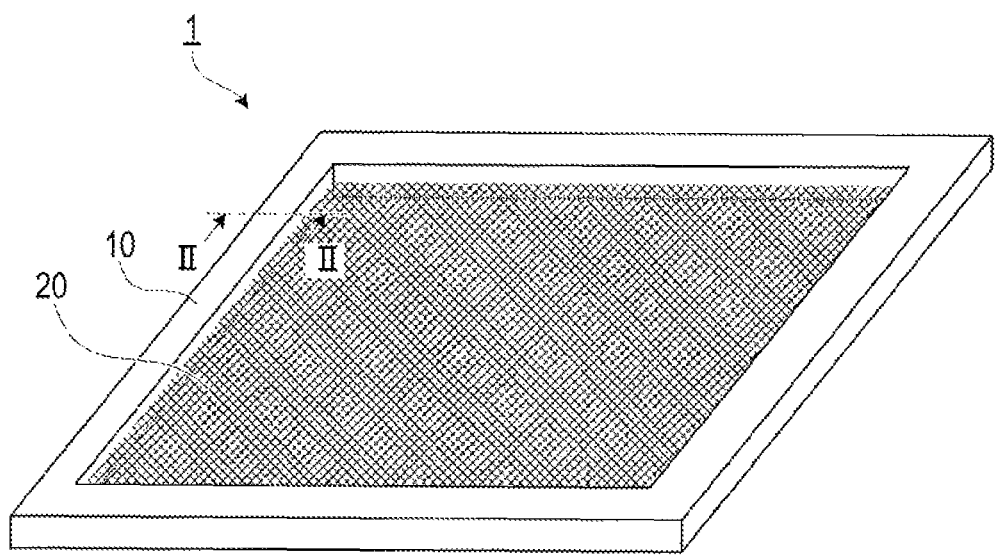
FIG. 1 is a perspective view showing a configuration of a frame member in an embodiment.

A frame member 1 in an embodiment of the present invention is to be used as a seat of a chair. As shown in FIG. 1, the frame member 1 includes a frame body 10 forming an opening penetrating in a front and back direction (in an upper and lower direction in FIG. 1), and a mesh-like sheet member 20 stretched over the frame body 10 so as to cover up the opening of the frame body 10.

Figure 2:
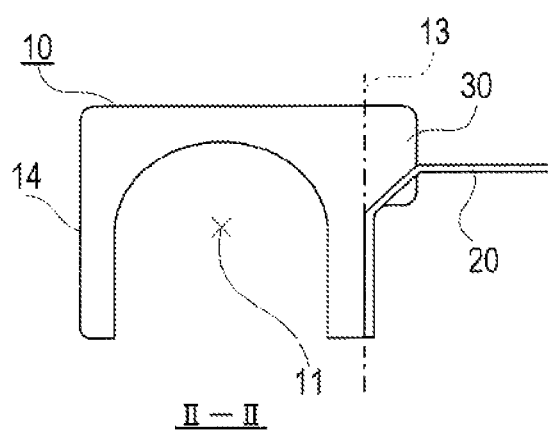
FIG. 2 is a cross-sectional view along line II-II of FIG. 1.

As shown in FIG. 2, the frame body 10 is provided with an attachment groove 11 for attaching an attachment object thereinto. The attachment groove 11 is formed in one of a front surface and a back surface (the back surface in the present embodiment; hereinafter the same as above) of the frame body 10.

The attachment groove 11 in the present embodiment continues over an entire circumference of the frame body 10. By attaching a leg portion (not shown) as the attachment object into the attachment groove 11, a chair having a seat supported by the leg portion is constituted.

The frame body 10 is also provided with a protruding portion 30 protruding inward (in other words, toward a central portion of the opening) on an inner circumferential surface 13 surrounding the opening. In the present embodiment, the protruding portion 30 is provided as a single member which continues over the entire circumference of the frame body 10.

The sheet member 20 is arranged such that an edge thereof, which has reached the protruding portion 30, passes through the protruding portion 30 obliquely (in a left lower direction in FIG. 2) along an inward and outward direction as well as the front and back direction of the frame body 10, and then advances along the inner circumferential surface 13 toward the front surface or the back surface of the frame body 10. Also, the edge of the sheet member 20 has reached one of the front surface and the back surface along the inner circumferential surface 13 of the frame body 10, and is cut along the surface which the edge has reached. The inner circumferential surface 13 is a surface (see a dashed-dotted line in FIG. 2) excluding the protruding portion 30 among surfaces, which face the opening, of the frame body 10.

The sheet member 20 is constituted by a mesh with holes sized to allow passage therethrough of a material for forming the frame body 10 in an unsolidified state.

(2) Manufacturing Method of the Frame Member 1

Figure 3A:
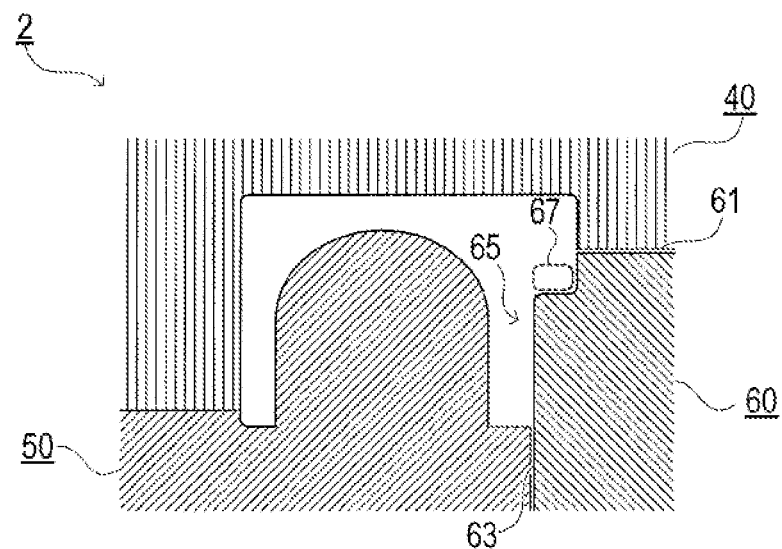
FIGS. 3A and 3B are cross-sectional views showing main parts of a molding apparatus.

The aforementioned frame member 1 is manufactured with a molding apparatus 2 described hereinafter. As shown in FIG. 3A, the molding apparatus 2 includes a first mold form 40, a second mold form 50, and a third mold form 60.

The first mold form 40 is shaped to provide a configuration of an opposite surface (the front surface in the present embodiment; hereinafter the same as above) to a surface (the back surface in the present embodiment; hereinafter the same as above) which is one of the front surface and the back surface of the frame body 10 and which the sheet member 20 is to reach. In addition, the first mold form 40 is shaped to provide a configuration of an outer surface 14 (see FIG. 2) of the frame body 10.

The second mold form 50 is shaped to provide a configuration of the surface of the frame body 10 which the sheet member 20 is to reach and a configuration of a portion of the frame body 10 outer than a position of arrangement of the sheet member 20 (however, excluding a portion with a configuration provided by the first mold form 40).

The third mold form 60 is shaped to provide a configuration of a portion of the frame body 10 inner than the position of arrangement of the sheet member 20 (however, excluding a portion with a configuration provided by the first mold form 40).

The third mold form 60 includes a positioning portion 65 for positioning the sheet member 20, the positioning portion 65 being configured between a surface 61 which sandwiches the sheet member 20 with the first mold form 40, and a surface 63 which sandwiches the sheet member 20 with the second mold form 50. Also, a part of the positioning portion 65 is configured as a recess 67 which extends toward one of or both of the inward and outward direction, and the front and back direction of the frame body 10. The recess 67 is shaped to provide a configuration of the protruding portion 30 of the frame body 10 in cooperation with a part of the first mold form 40.

Figure 3B:
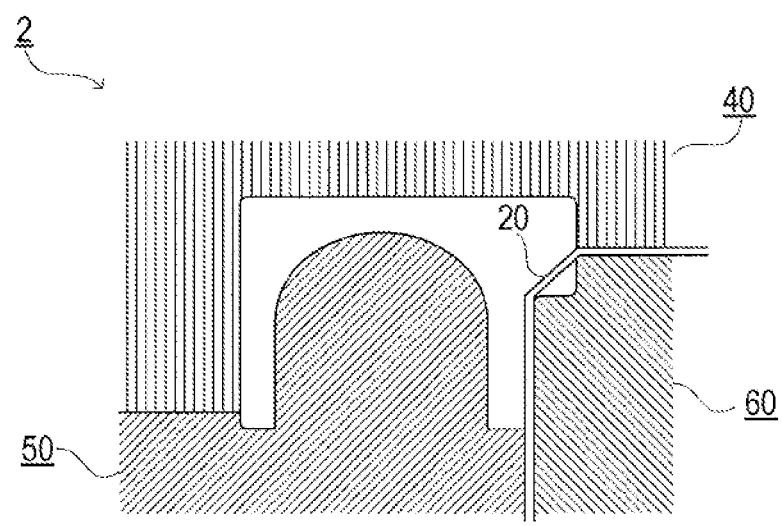

In the molding apparatus 2, as shown in FIG. 3B, by positioning the sheet member 20 in a state of being sandwiched between the first mold form 40 and the third mold form 60, as well as between the second mold form 50 and the third mold form 60, and assembling the first mold form 40, the second mold form 50, and the third mold form 60, a configuration of the frame body 10 is provided by an area surrounded by the assembled mold forms.

In the present embodiment, by assembling the first mold form 40, the second mold form 50, and the third mold form 60, filling a material for the frame body 10 in an unsolidified state into the area surrounded by the assembled mold forms, and then solidifying the material, the frame member 1 with the sheet member 20 stretched over and fixed to the frame body 10 is manufactured.

In the present embodiment, a resin is employed as the material for the frame body 10. The frame member 1 is manufactured by injection molding of the resin into the area surrounded by the mold forms.

(3) Operation and Effect

Since the frame member 1 in the aforementioned embodiment has a structure in which the sheet member 20 is fixed to the frame body 10 such that the sheet member 20 reaches the front surface or the back surface of the frame body 10 along the inner circumferential surface 13 of the frame body 10, and the sheet member 20 is concealed on an inner side of the frame body 10, the edge of the sheet member 20 becomes less externally visible. It is, therefore, possible to suppress the appearance of the frame member 1 from being spoiled.

Also, the aforementioned embodiment is configured such that the sheet member 20 reaches the front surface or the back surface of the frame body 10 along the inner circumferential surface 13 thereof and the edge of the sheet member 20 will not project into the attachment groove 11. Accordingly, the edge of the sheet member 20 will not interfere with the attachment object. It is, therefore, possible to suppress deterioration in attachment accuracy of the attachment object.

According to the aforementioned embodiment, as described above, it is possible to attach the attachment object to the frame member 1 in a more accurate manner as well as to prevent spoiling the appearance of the frame member 1.

(4) Modified Examples

Although the embodiment of the present invention has been described above, it is to be understood that the present invention is not at all limited to the above described embodiment, but may be practiced in various formed without departing from the technical scope of the present invention.

For example, the sheet member 20 is obliquely arranged in the protruding portion 30 and is arranged in the front and back direction along the inner circumferential surface 13 of the frame body 10 in the aforementioned embodiment. However, the sheet member 20 may be arranged so as to be present to extend by a specified distance along the inward and outward direction at the protruding portion 30.

Figure 4A:
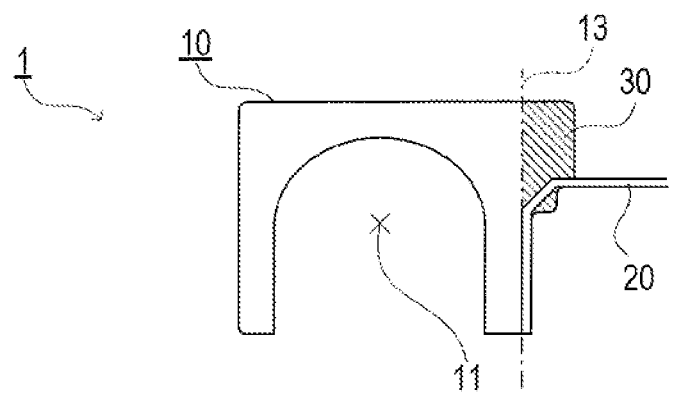
FIGS. 4A and 4B are cross-sectional views showing a frame body and main parts of a molding apparatus in another embodiment.

Specifically, as shown in FIG. 4A, it may be possible to provide a step portion in the inward and outward direction by making a protruding amount of the protruding portion 30 on a side of the back surface (a lower side in FIG. 4A) smaller than a protruding amount thereof on a side of the front surface (an upper side in FIG. 4A), and arrange the sheet member 20 to extend by the specified distance along the inward and outward direction by the step portion.

Figure 4B:
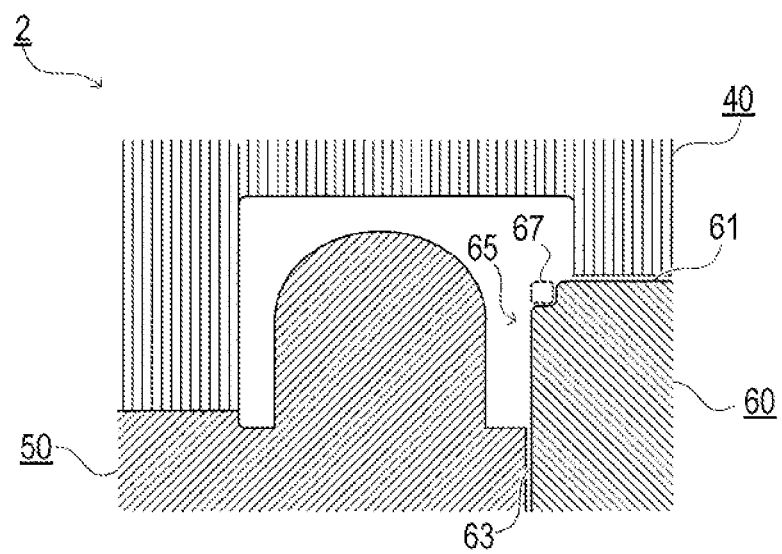

In this case, when manufacturing the frame member 1, it may be possible to use a molding apparatus 2 which employs the third mold form 60, including the recess 67 of the positioning portion 65 shaped to provide the step portion of the protruding portion 30 as shown in FIG. 4B.

Figure 5A:
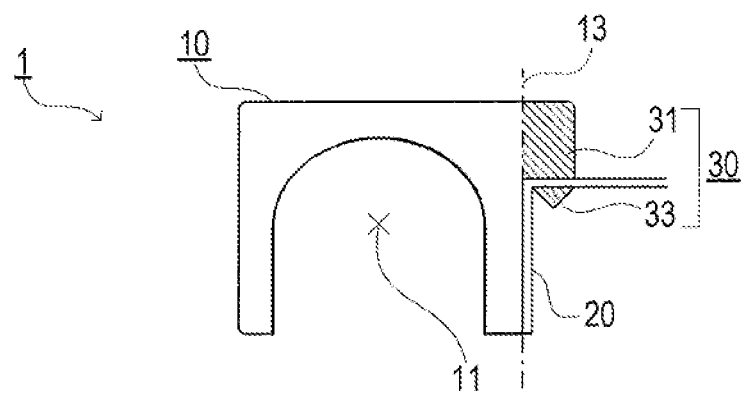
FIGS. 5A and 5B are cross-sectional views showing a frame body and main parts of a molding apparatus in a further embodiment.

Also, the aforementioned embodiment exemplifies the configuration in which the protruding portion 30 of the frame body 10 protrudes inward. The protruding portion 30 may include a protruding part 31 which protrudes inward from the inner circumferential surface 13 of the frame body 10 and an extending part 33 which extends from an end of the protruding part 31 along the inner circumferential surface 13 (extending downward) as shown in FIG. 5A.

Figure 5B:
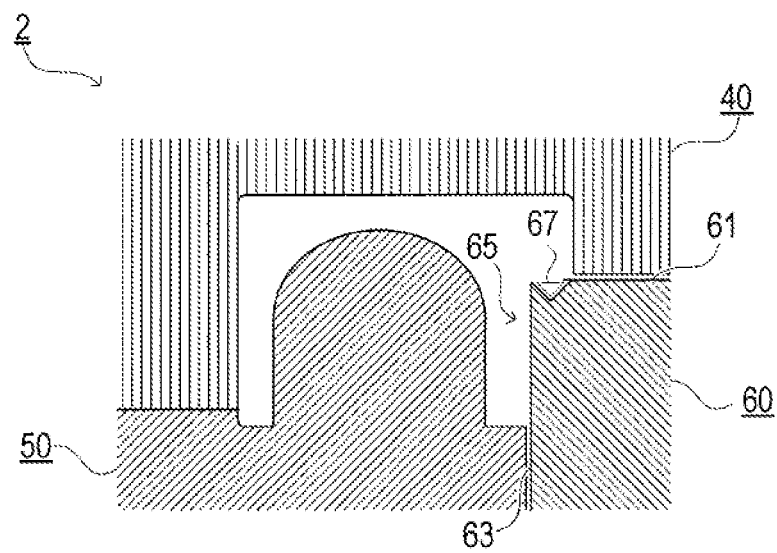

In this case, when manufacturing the frame member 1, it may be possible to use a molding apparatus 2 which employs the third mold form 60, including the recess 67 of the positioning portion 65 shaped to provide configurations of the protruding part 31 and the extending part 33 as shown in FIG. 5B.

In this configuration, the sheet member 20 extendingly exists by at least a specified distance in the inward and outward direction. With such configuration, a passing direction of the sheet member 20 (a direction of extendingly existing) and a stretched direction of the sheet member 20 are approximate (in other words, an angle difference between the passing direction of the sheet member 20 and the stretched direction of the sheet member 20 becomes minimum), and it is possible to suppress the sheet member 20 in a stretched state from being taken off. Thus, the sheet member 20 and the frame body 10 can be more firmly fixed to each other.

In this configuration, the distance of sheet member 20 passing in the inward and outward direction (the distance of the sheet member extendingly existing) may be determined depending on a tensile force which may be generated in the sheet member 20, and the distance may be sufficient as long as a minimum attachment strength of the sheet member 20 can be ensured.

Figure 6A:
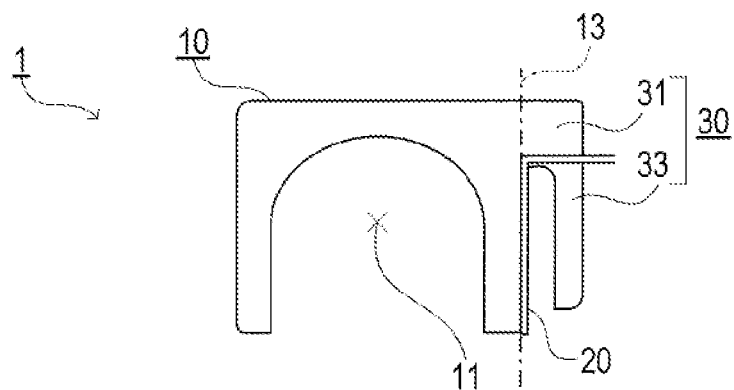
FIGS. 6A and 6B are cross-sectional views showing a frame body and main parts of a molding apparatus in a yet another embodiment.

In this case, as shown in FIG. 6A, by forming the extending part 33 to have a predetermined length along the front and back direction, the protruding part 31 and the extending part 33 of the protruding portion 30 constitute a rib configuration. The rib configuration allows to resist a force in a direction of bending the frame body 10, resulting in an improved strength as a frame of the frame body 10.

Figure 6B:
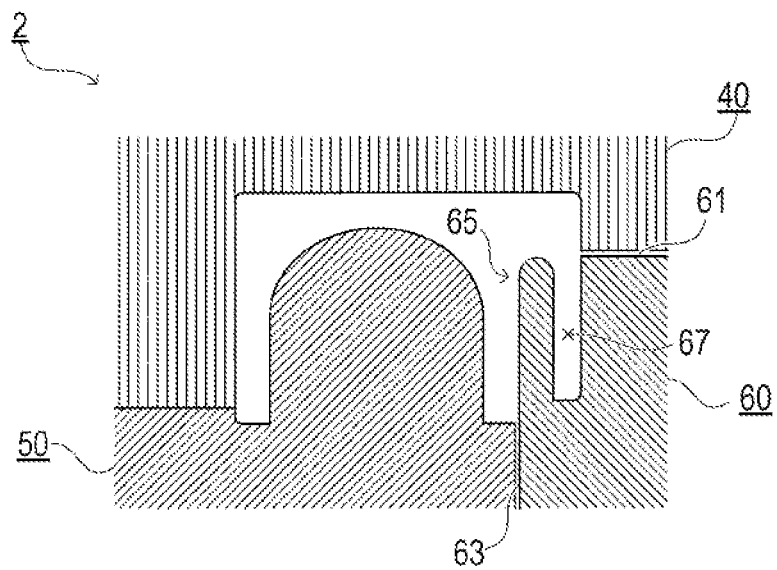

In this case, when manufacturing the frame member 1, it may be possible to use a molding apparatus 2 which employs the third mold form 60, including the recess 67 shaped to provide the configuration of the extending part 33 having the predetermined length as shown in FIG. 6B.

In this configuration, the extending part 33 of the protruding portion 30 may have a length allowing contribution to the strength of the frame body 10. Alternatively, the extending part 33 may have a length so as to reach the front surface or the back surface along the inner circumferential surface 13 of the frame body 10. In this case, the sheet member 20 located on the inner side of the frame body 10 may be covered with the extending part 33, which may also suppress spoiling of the appearance.

Figure 7A:
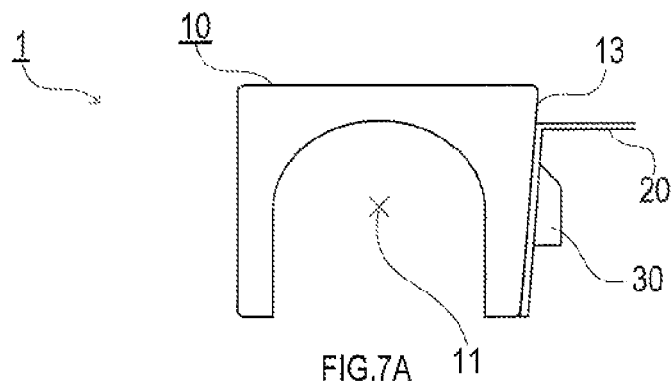
FIGS. 7A to 7C are cross-sectional views showing a frame body and main parts of a molding apparatus in a yet further embodiment.

Further, the aforementioned embodiment exemplifies a configuration in which the sheet member 20 reaches the protruding portion 30, passes the protruding portion 30, and then reaches one of the front surface and the back surface of frame body 10 along the inner circumferential surface 13 of the frame body 10. Alternatively, the sheet member 20 may be configured, as shown in FIG. 7A, to first reach the inner circumferential surface 13, and subsequently pass the protruding portion 30 formed along the inner circumferential surface 13 to reach one of the front surface and the back surface.

Figure 7B:
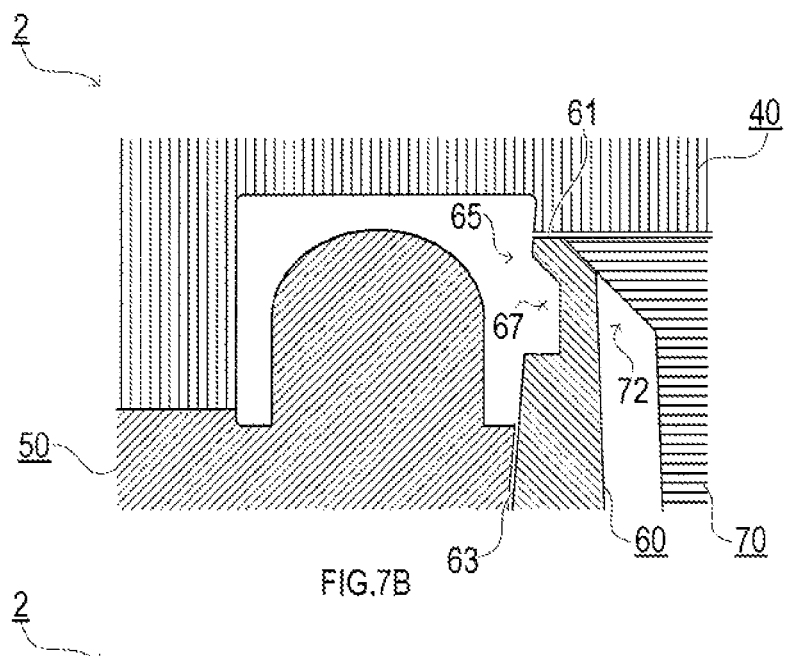
Figure 7C:
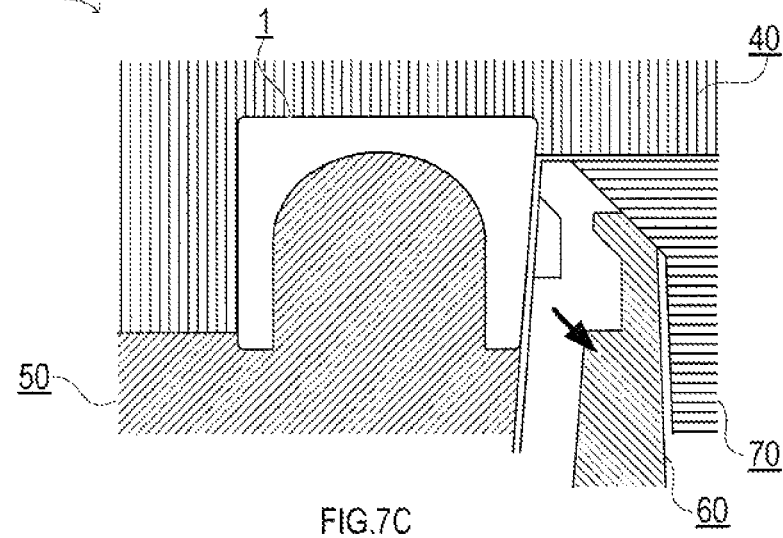

In this case, when manufacturing the frame member 1, it may be possible to use a molding apparatus 2 which employs the third mold form 60, including the recess 67 of the positioning portion 65 shaped to provide the configuration of the protruding portion 30 as shown in FIG. 7B, and which includes a fourth mold form 70 with a sliding surface 72 allowing an opening and closing operation of the third mold form 60 after manufacturing the frame member 1 (see FIG. 7B and FIG. 7C).

Moreover, the aforementioned embodiment exemplifies a configuration in which the attachment groove 11 in the frame body 10 continues over the entire circumference of the frame body 10. However, the attachment groove 11 may be formed at predetermined intervals over the entire circumference of the frame body 10. In other words, the attachment groove 11 may be formed as a plurality of discontinued grooves.

Figure 8A:
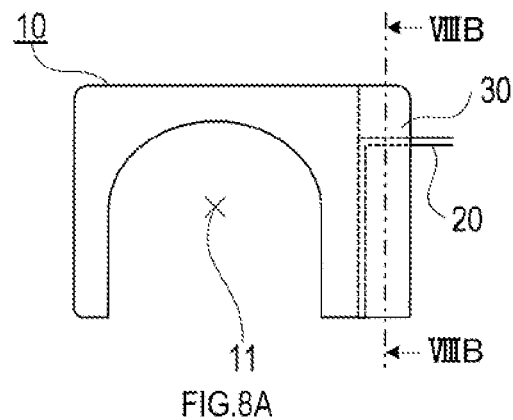
FIGS. 8A to 8C are views showing main parts of a frame body in a still further embodiment.
Figure 8B:
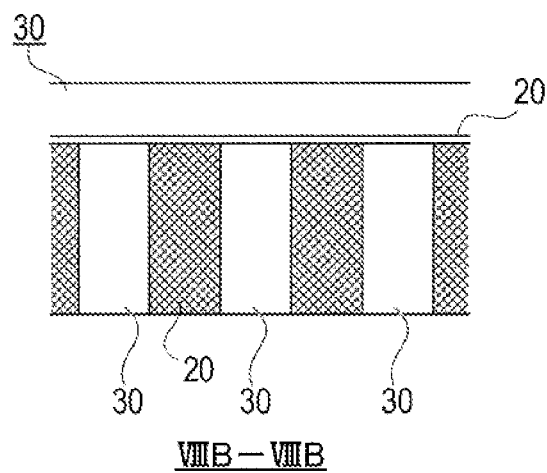
Figure 8C:
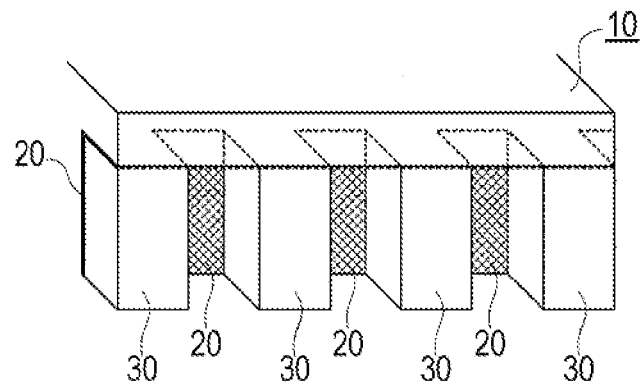

Also, the aforementioned embodiment exemplifies a configuration in which the protruding portion 30 of the frame body 10 is formed to continue over the entire circumference of the frame body 10. However, the protruding portion 30 may be formed at predetermined intervals over the entire circumference of the frame body 10 as shown in FIG. 8B and FIG. 8C. In other words, the protruding portion 30 may be formed as a plurality of discontinued protruding portions.

What is claimed is:

1. A frame member comprising:
    a frame body, including:
        a front surface;
        a back surface; and
        an opening that penetrates in a front and back direction of the frame body,
            one of the front surface and the back surface having an attachment groove formed to attach a predetermined attachment object thereinto, and
            a sheet member to be stretched over the opening of the frame body, the sheet member being constituted by a mesh-like member with holes sized to allow passage therethrough of a material for the frame body in an unsolidified state,
        wherein the frame body includes a protruding portion protruding inward from an inner circumferential surface of the frame body, the protruding portion being configured such that, after the sheet member is arranged along at least one of an inward and outward direction, and the front and back direction of the frame body in an area where the protruding portion is to be formed, the material for the frame body in the unsolidified state is filled into the area and is solidified, to thereby form the protruding portion together with the frame body, and fix the sheet member in a stretched state over the opening, and
        wherein the sheet member is terminated upon reaching one of the front surface and the back surface along the inner circumferential surface of the frame body, after passing through the protruding portion without passing through portions other than the protruding portion.

2. The frame member according to claim 1, wherein the sheet member is arranged such that an edge of the sheet member, which has reached the protruding portion, passes along the inward and outward direction of the frame body by a specified distance, and subsequently advances toward one of a front surface side and a back surface side of the frame body along the inner circumferential surface of the frame body.

3. The frame member according to claim 1, wherein the protruding portion includes:
    a protruding part that protrudes inward from the inner circumferential surface of the frame body; and
    an extending part that extends from an end of the protruding part along the inner circumferential surface.

* * * * *